Patented Oct. 22, 1940

2,218,628

UNITED STATES PATENT OFFICE 2,218,628

COLORATION OF TEXTILE AND OTHER MATERIALS

Percy Frederick Combe Sowter, Spondon, near Derby, England, assignor to Celanese Corporation of America, a corporation of Delaware No Drawing. Application August 20, 1937, Serial No. 160,055. In Great Britain July 19, 1935

5 Claims. (Cl. 8—35)

This application is a continuation in part of my application S. No. 89,661 filed July 8, 1936, and relates to the coloration of materials having a basis of cellulose acetate or other organic derivative of cellulose.

In coloring rapidly moving running threads, for example by passing them through a bath of coloring matter solution, long periods of immersion in the dye liquid and long drying periods are impracticable owing to the very large apparatus required. For instance, in the case of a thread running at 60 yards per minute a dry-thread running at 60 yards per minute a drying time of 5 minutes involves a 300 yard run through the drying device. It is essential therefore, that the dye liquid shall be one capable of very rapid penetration into the yarn, and that the solvent employed shall be one readily evaporated after the dyeing process. If the dye solution does not penetrate well into the yarn, then dyeings of very poor fastness to rubbing are very liable to be produced. It is further necessary that the concentration of the dye in the liquid shall be considerable, as the running thread takes up only some two or three times its weight of the liquid, and the dye necessary to give the required color must be dissolved in this amount of liquid. For ordinary purposes it is generally necessary to employ dye concentrations of the order of 0.1 to 1%.

I have found that organic liquid media comprising a volatile carboxylic ester fulfil the requirements for dye solvents in dye solutions to be used for the coloration of running threads. The volatile carboxylic esters are excellent solvents for most of the dyestuffs having affinity for cellulose acetate. Further, with their aid dyestuff solutions can be prepared which have very good penetrative power for cellulose acetate and hence enable shades fast to rubbing to be obtained.

The volatile carboxylic ester should constitute a large proportion of the organic liquid medium. Thus, solutions of dyestuff in liquids containing 20, 40, 60, 80% or more of volatile carboxylic ester may be employed.

As examples of esters suitable for use in accordance with the invention mention may be made of ethyl formate, ethyl acetate, methyl acetate and isopropyl acetate. Other volatile carboxylic esters, particularly such as have boiling points below about 130° C., and particularly below about 100° or 110° C. may however be used. They may be employed alone where they exercise the requisite penetrative power for the cellulose acetate or other material to be treated. If they exercise an undesirably strong softening action on the materials, this may be diminished by diluting them with liquids of little or no softening action, for example benzene, toluene, xylene or other aromatic hydrocarbons in the case of cellulose acetate. Other diluents may, however, be employed, for example aliphatic hydrocarbons, e. g., petrol (gasoline), or carbon tetrachloride, dichlorethylene, trichlorethylene, or other chlorinated hydrocarbons which are comparatively inert towards cellulose acetate. Where a diluent is employed to reduce the softening power of the volatile ester it is desirable that it should be less volatile than the ester, in order that during drying there may be at no time a liquid of undesirably high solvent power upon the materials. For example, a mixture of ethyl acetate and xylene may be used containing about 20% of the latter. Preferably any organic liquids used in conjunction with the carboxylic esters have boiling points below about 130° C.

Particularly useful mixtures are mixtures comprising the foregoing esters together with alcohols, particularly volatile water-miscible alcohols such as ethyl, methyl, propyl, and isopropyl alcohols. Such a mixture is that of ethyl acetate with ethyl alcohol, for example a mixture containing from 40-60% of ethyl acetate. These mixtures of ethyl acetate and alcohol have extremely good solvent power for cellulose acetate dyestuffs. Moreover, considerable amounts of water may be added to such mixtures without rendering them useless as a solvent for the dyestuffs employed. This is of advantage in two directions. In the first place the use of water cheapens the dyebath, and in the second place by addition of water the penetrative power of the dye solution for cellulose acetate may be varied within fairly wide limits. A particularly useful mixture is one of about 40 parts of ethyl acetate, about 60 parts of absolute alcohol, and about 20 parts of water. This mixture has an excellent penetrative power for cellulose acetate, and at the same time is a very good solvent for cellulose acetate dyestuffs. Another mixture having good penetrative power for cellulose acetate is one of about 40 parts of ethyl acetate, about 60 parts of ethyl alcohol, and about 70 parts of water. As a solvent for water-insoluble dyestuffs, however, such a mixture is inferior to that containing the smaller proportion of water. The mixtures containing intermediate amounts of water have a stronger penetrative power for cellulose acetate.

The most advantageous constitution of the solvent depends upon the nature of the material to be colored. The foregoing mixtures of ethyl acetate, alcohol and water are suitable for use in the case of ordinary commercial cellulose acetate. However, in the case of cellulose acetate filaments which have been stretched, e. g., after softening with organic solvents or in the presence of steam, different mixtures may be desirable. A suitable mixture in such a case is one containing about 70 parts of ethyl acetate, 60 of ethyl alcohol and 10 of water by volume.

Though as indicated above the liquids may contain water, any water-content is preferably not more than about 50%, e. g., 5–25%.

The application of the dye solutions to the running threads may be effected in various ways. Most conveniently the thread is passed through a bath of the solution of the dye, and thereafter given a short passage through a drying device. After passage through the dye liquid, any liquid carried by the threads in excess of that required to give the desired shade may be removed in any suitable manner, for example by passing the threads between a pair of lightly loaded squeezing rolls. The time of immersion in the dyebath may be very short, for example of the order of 1 second in the case of the specific mixtures of ethyl acetate, alcohol and water referred to above. With a length of passage through the bath of only a few feet, therefore, it is possible to secure good dyeings when the threads are travelling at about 60 yards a minute. The concentration of the dye in the bath may be of the order of 0.1 to 1%, according to the depth of color required.

In many cases, particularly when producing pale shades, it is sufficient to dry the threads immediately after their passage through the bath. In some cases, however, particularly when producing heavy shades, such a procedure leads to threads having considerable deposition of surface color. This is undesirable as the dyeings of this character are not fast to rubbing. I have found that in such cases it is advantageous to wash the threads with an organic liquid, and preferably an organic liquid which is a solvent for the dyestuff and/or a softening agent for the material of the threads. For example, the threads, after immersion in the dyebath, may be washed by passing them through a bath of the solvent mixture employed in the preparation of the dyebath. Such a treatment weakens the dyeing slightly, but at the same time effects a very great improvement in the fastness to rubbing. It appears that such a treatment with a softening agent for the threads serves to carry the surface dyestuff into the material of the filaments.

If desired, instead of using pure softening agent, there may be applied a solution of dyestuff which is weaker than that initially employed to produce the dyeing. In this way surface color may be removed without any material weakening of the color.

If desired dyeings produced in accordance with the invention may subsequently be steamed. Such steaming forms a valuable alternative to an after-treatment with a softening agent as described above, though in general it is not so convenient. Any steaming may be conducted in the manner well known in the art of coloring textiles.

Cellulose acetate in other forms having at least one dimension small, e. g., less than 0.005 inch and particularly less than 0.002 inch, for example cellulose acetate in the form of straws, foils or the like, may be colored similarly.

As indicated above the dye solutions comprising volatile esters are of especial interest in connection with the coloration of running threads, foils, straws and the like. Fabrics may be colored similarly. For example, fabric may be dyed by a short passage through a bath of the dye solution after the manner described above in connection with the dyeing of threads. Again, it may be padded with the dye solution, excess dye solution being removed by passage through a pair of squeezing rollers.

A wide range of dyestuffs may be employed in the process according to the invention. Water-insoluble dyestuffs of the kind extensively employed for the dyeing of cellulose acetate are particularly useful. Such dyestuffs may, for example, be water-insoluble azo dyes, water-insoluble dyestuffs of the nitro-diarylamine series, water-insoluble indigoid dyestuffs, and water-insoluble dyes of the amino-anthraquinone series, e. g., 1:4-diamino-anthraquinone, 1-amino-4-oxyanthraquinone, 1:4-di-(methylamino)-anthraquinone, and 1:4-di-(ethanolamino)-5:8-dioxy-anthraquinone.

Again the new process may be used to apply leuco compounds of vat dyestuffs, whether of the indigoid, anthraquinone, or other series, in the free state, or in the form of salts, or in the form of derivatives which can readily be converted into the parent vat dyestuff on the material to be colored. Such derivatives may be esters of sulphuric, phosphoric or other polybasic acids. The esters may for instance be acid sulphuric or phosphoric esters in the form of salts. Conveniently such acid esters are employed in the form of salts with organic bases, for example methylamine or pyridine, or triethanolamine or other alkylolamine. Such salts with organic bases have considerable advantages as regards their solubility in organic solvents.

Other esters which may be applied are the neutral esters in which the residue of the acid is attached on the one hand to the dyestuff molecule and on the other hand to another radical, e. g., an alkyl radical. Examples of such neutral esters are the methyl, ethyl, propyl, butyl, and amyl sulphuric esters of leuco compounds of vat dyestuffs, such as can be obtained by the action of an alkyl ester of chlorsulphonic acid upon the leuco compound of the vat dyestuff in presence of a tertiary base. These alkyl sulphuric esters, like the salts of organic bases with the acid sulphuric esters, have considerable advantages as regards solubility in organic solvents. Ether derivatives of leuco compounds of vat dyes may also be applied by the new method, for example ether derivatives obtainable by the action of a halogen fatty acid, e. g., chloracetic acid, upon alkali metal salts of leuco compounds of vat dyes.

When applying the above mentioned derivatives of leuco compounds of vat dyestuffs it may be desirable to use a solvent of composition differing from that indicated above as suitable for use with other dyestuffs. For instance, the above-mentioned mixture of about 40 parts of ethyl acetate, 60 parts of alcohol and 70 parts of water has better solvent power for the salts of sulphuric esters of vat dyestuffs than has the above-mentioned mixture containing a lower proportion of water. As examples of specific dyestuffs of this character suitable for application by the new process, mention may be made of the following: Indigosol Scarlet HB, Indigosol OR, Indigosol Brown 1RRD, and Indigosol Printing Black. These may be applied to the cellulose acetate in proportions of about 1-4%, according to the shade required.

The derivatives of leuco compounds of vat dyestuffs, after application to the materials, require hydrolysis and oxidation to convert them into the parent dyestuffs. In the case of salts of acid esters such as salts of acid sulphuric esters, this may very readily be effected by treatment with suitable acid oxidising agents, e. g., with nitrite and acid or with acidified bichromate. The acid oxidation may be effected concurrently with the application of the esterified leuco compound to the running materials, e. g., by passing the threads carrying the esterified leuco compound through a bath of the acid oxidising agent. If desired a nitrite or other agent which is inactive as an oxidising agent except when acidified may be applied with the esterified leuco compound and hydrolysis and oxidation effected merely by treatment with acid, e. g., in vapour form or in solution in water or an organic solvent.

The invention has been described more particularly with reference to the coloration of cellulose acetate materials. The new method is not, however, restricted to the coloration of such materials, but may be applied to filaments, foils, straws and the like made of or containing other organic derivatives of cellulose, for example cellulose formate, propionate, butyrate, or other cellulose ester of an organic acid, or ethyl, methyl, benzyl or other ether of cellulose.

Having described my invention, what I desire to secure by Letters Patent is:

1. Process for the coloration of threads of filaments of cellulose acetate, which comprises running the thread through a solution of a dyestuff in a mixture of about 40 parts of ethyl acetate, about 60 parts of ethyl alcohol and about 20 parts of water.

2. Process for the coloration of threads of filaments of cellulose acetate, which comprises running the threads first through a solution of a dyestuff in a mixture of about 40 parts of ethyl acetate, about 60 parts of ethyl alcohol and about 20 parts of water, then through a second dye solution of which the only substantial difference in composition from the first is a lower dyestuff concentration, and thereafter drying the material.

3. Process for the coloration of threads of filaments of cellulose acetate, which comprises running the threads through a solution of a derivative of leuco compound of a vat dyestuff in a mixture of about 40 parts of ethyl acetate, about 60 parts of ethyl alcohol and about 20 parts of water, said derivative being capable of conversion to the parent vat dyestuff upon the threads.

4. Process for the coloration of threads of filaments of cellulose acetate, which comprises running the threads through a solution of a salt of an organic base with an acid ester of a leuco compound of a vat dyestuff in a mixture of about 40 parts of ethyl acetate, about 60 parts of ethyl alcohol and about 20 parts of water.

5. Process for the coloration of threads of filaments of cellulose acetate, which comprises running the threads through a solution of an alkyl sulphuric ester of a leuco compound of a vat dyestuff in a mixture of about 40 parts of ethyl acetate, about 60 parts of ethyl alcohol and about 20 parts of water.

PERCY FREDERICK COMBE SOWTER.